(12) United States Patent
Douetteau et al.

(10) Patent No.: US 9,122,769 B2
(45) Date of Patent: Sep. 1, 2015

(54) METHOD AND SYSTEM FOR PROCESSING INFORMATION OF A STREAM OF INFORMATION

(75) Inventors: Florian Douetteau, Paris (FR); Abdelmajid Boubrik, Paris (FR); Jeremie Bordier, Paris (FR); Andrea Luzzardi, Paris (FR); Tanguy Moal, Hostens (FR)

(73) Assignee: Dassault Systemes, Velizy-Villacoublay (FR)

( * ) Notice: Subject to any disclaimer, the term of this patent is extended or adjusted under 35 U.S.C. 154(b) by 0 days.

(21) Appl. No.: 13/502,517

(22) PCT Filed: Oct. 12, 2010

(86) PCT No.: PCT/IB2010/054605
§ 371 (c)(1),
(2), (4) Date: Apr. 17, 2012

(87) PCT Pub. No.: WO2011/051849
PCT Pub. Date: May 5, 2011

(65) Prior Publication Data
US 2012/0203747 A1  Aug. 9, 2012

(30) Foreign Application Priority Data

Oct. 27, 2009  (EP) .................................. 09290821

(51) Int. Cl.
*G06F 17/30* (2006.01)
(52) U.S. Cl.
CPC .... *G06F 17/30911* (2013.01); *G06F 17/30864* (2013.01)
(58) Field of Classification Search
CPC ................................................ G06F 17/30911
USPC ........................................................ 707/696
See application file for complete search history.

(56) References Cited

U.S. PATENT DOCUMENTS 7,035,925 B1    4/2006  Nareddy et al.
7,756,919 B1 *  7/2010  Dean et al. .................... 709/201
(Continued)

FOREIGN PATENT DOCUMENTS

EP   1542140 A2   6/2005
JP   10-091638    4/1998
(Continued)

OTHER PUBLICATIONS

Dean et al., MapReduce: Simplified Data Processing on Large Clusters, 2004, USENIX Association, OSDI '04: 6th Symposium on Operating Systems Design and Implementation, pp. 137-149.*

(Continued)

*Primary Examiner* — Apu Mofiz
*Assistant Examiner* — Dara J Glasser
(74) *Attorney, Agent, or Firm* — Hamilton, Brook, Smith & Reynolds, P.C.

(57) ABSTRACT

The invention is directed to a computer-implemented process for processing information related to entities and said entities being contained in a stream of information, the entities being stored in resource directories of a system, each resource directory containing entities and being annotated with a version number modified with the addition of at least one new entity. The process comprises the steps of: retrieving a stream of information from different information sources; processing segments of information from the stream of information in accordance with entities of said resource directories; storing the segments of information with an annotation indicating which version of said resource directories was used for processing said information segment; updating at least one of the said resource directories with at least one new entity and updating the version number of said at least one resource directory; and—reprocessing the stored segments of information containing the annotation indicating said segments of information were processed with a previous version of the at least one resource directory.

14 Claims, 2 Drawing Sheets

(56) References Cited

U.S. PATENT DOCUMENTS

2005/0131906 A1* 6/2005 Shin ............................... 707/10
2005/0271304 A1* 12/2005 Retterath et al. .............. 382/305

FOREIGN PATENT DOCUMENTS

| JP | 2002-351873 | 12/2002 |
| JP | 2005-174332 | 6/2005 |
| JP | 2005-322159 | 11/2005 |
| JP | 2010-092222 | 4/2010 |

OTHER PUBLICATIONS

International Search Report in International Application No. PCT/IB2010/054605, Date of Mailing: May 20, 2011.
Satnam Alag, "Collective Intelligence in Action," the First Edition, pp. 145-172, Manning Publishing, Nov. 7, 2008 (ISBN 1933988312).

* cited by examiner

METHOD AND SYSTEM FOR PROCESSING INFORMATION OF A STREAM OF INFORMATION

This application is the U.S. National Stage of International Application No. PCT/IB2010/054605, filed Oct. 12, 2010, which designates the U.S., published in English, and claims priority under 35 U.S.C. §§119 or 365(c) to EP Application No. 09290821.9, filed Oct. 27, 2009. The entire teachings of the above applications are incorporated herein by reference.

The invention relates to the field of computers programs and systems, and more specifically to the field of information management wherein information is related to entities and is contained in information streams.

Web Search engines (such as Google (trademark), MSN search (trademark), AllTheWeb (trademark) provide a way to access information records from an unique index. To this aim, a search engine first crawls the web in order to discover new content. Next, the content is indexed: it is parsed and stored to facilitate fast and accurate information retrieval. Then, a user queries the search engine in order to obtain a result, the search results being in general presented in a list.

Crawling the Web is a difficult task. Indeed, the web crawler faces large volumes of data and cannot download the whole content of the Web. In addition, the content of the Web is constantly changed; this dynamicity implies that the web crawling must regularly check whether new content has been added, and also check if an already known content has been updated or even deleted. Thus, web crawlers not only perform several processing treatments requiring huge computational resources, but also consuming network bandwidth as the content is fetched and transmitted to the web crawler.

To this aim, caching systems have been developed to ease the above mentioned limitations. A caching system stores a version of previously seen information in order to improve response time when the information is queried and needs to be displayed. For instance, web caches are employed by web browsers and web proxy servers to store previous responses from web servers, such as web pages. Web caches reduce the amount of information that needs to be transmitted across the network, as information previously stored in the cache can often be re-used. Moreover, caching helps to improve responsiveness for users of the web. However, web caches are not adapted for processing the huge amount of data retrieved by a web crawler: indeed, they store copies of data passing through them without providing means for managing the stored data nor reducing the storage costs.

The U.S. Pat. No. 7,523,137 discloses a system for extracting information concerning events involving discovered entities also referred as event objects. This document teaches that articles are fetched once and then stored locally for a one-time processing. Each article is processed one time using an existing environment model to filter out (e.g., to remove) content which is not of interest, according to the particular industry focus for the particular system implementation. An event processing control program filters the fetched articles which are not relevant to the entities defined in the environment model. As a result, the analysis system eliminates a significant percentage (e.g., 99% or more) of retrieved information prior to applying the event detection engine on the new article.

However, the fetched articles are not retain by the system, which means that articles are fetched again when, for instance, the article is updated and need to be treated again. Thus, the system requires downloading the same (or similar) content several times.

The U.S. Patent Application 2007/0011175 discloses how to extract structured and unstructured data from multiple data sources to a capture schema and to transform and analyze unstructured data to load it into an analysis schema. This document teaches how to provide a structured view of unstructured and structured data, to perform, for instance, analysis (e.g. business intelligence) on this data. However, this document does not tackle the problem of how to manage the creation of new resources in data and to manage these changes against new and already seen Business Data.

Thus, according to the limitations of the existing solutions briefly described above, there is a need for an improved processing of information which manages segments of information in a more efficient way in order to reduce the reprocessing of data and the amount of stored data.

The invention therefore provides a computer-implemented process for processing information related to entities and said entities being contained in a stream of information. The entities are included in resource directories of the system, each resource directory containing entities and being annotated with a version number modified after the addition of at least one new entity. The process comprises the steps of:

retrieving a stream of information from different information sources;

processing segments of information from the stream of information in accordance with entities of said resource directories;

storing the segments of information with an annotation indicating which version of said resource directories was used for processing said information segment;

updating at least one of the said resource directories with at least one new entity and updating the version number of said at least one resource directory; and reprocessing the stored segments of information containing the annotation indicating said segments of information were processed with a previous version of the at least one resource directory.

The process may also comprise:

a new entity added to a resource directory containing an annotation indicating the version number given to said resource directory once modified with the addition of said new entity added, and the step of reprocessing further comprising reprocessing the stored segments of information in accordance with the new entities added to said resource directories;

a unique identifier assigned to each processed segments of information and to each entity;

the identifier assigned to each new entity is the same as the identifier of the processed segment which revealed the said each new entity;

at the step of processing segments of information from the stream of information, new entities are revealed or inputted by a user and are added in the corresponding resource directories;

the processed segments of information are data structures;

the processed segments of information comprise a type, an optional universal resource identifier, and a set of unconstrained metadata, each metadata comprising a key and a value pair;

the processed segments of information from the stream of information are stored according to selected information sources;

prior to the step of processing segments of information from the stream, the step of assigning the retrieved stream of information into a mapper queue, the mapper queue being selected according to the information source of the stream of information and being processed by a map-reduce mechanism;

after the step of processing segments of information from the stream of information, the steps of:

assigning the processed stream of information into a reducer queue, the reducer queue being selected according to the information source of the stream of information;

for each existing entity, enriching a profile of the entity with information resulting from the step of processing segments of information from the stream of information; and for each revealed new entity, creating a new profile of the new entity and enriching the profile with information resulting from the step of processing segments of information from the stream of information;

wherein the profile of the existing entity or the new profile of the new entity comprises a type and a predefined set of metadata, each metadata comprising a key and a value pair;

the profile of the existing entity and the new profile of the new entity are stored in a profile repository;

sending a completed profile of an entity to an indexing engine;

at the step of processing segments of information from the stream of information, a mapping between a universal resource locator identified in one of the segments of information and the unique identifier assigned to said one of the segments of information is registered by the system into a hash directory.

The invention further proposes a computer program, stored on a computer readable medium, for processing information related to entities and being contained in a stream of information, the entities being comprised in resource directories of a system, each resource directory containing entities and being annotated with a version number modified with the addition of at least one new entity, comprising code means for causing a computer to take the steps of the process.

The invention still concerns an apparatus for processing information related to entities and being contained in a stream of information, the entities being stored in resource directories of a system, each resource directory containing entities and being annotated with a version number modified with the addition of at least one new entity, the apparatus comprising means for implementing the steps of the process.

A process according to the invention and system embodying the invention will now be described, by way of non-limiting example, and in reference to the accompanying drawings, where:

FIG. 1 exemplifies a consolidation box inserted between streams of information and an indexing engine;

The invention concerns a computer-implemented process for processing information related to entities and said entities being contained in a stream of information. An entity is a typed data, wherein a typed data may additionally comprise a set of values, links to other typed data and possibly operations on those values. For instance, a typed data may be a client name, a city, a product name, a sentiment value, a payment method. The entities are stored in resource directories of a system. Each resource directory contains entities and is annotated with a version number modified with the addition of at least one new entity. A version number may be used for keeping track of incrementally different version of data, indicating, for example, the freshness of data stored on the system.

The process comprises a step of retrieving a stream of information from different information sources. Next, segments of information are processed from the stream of information in accordance with entities of said resource directories. Typically, information for the entities found in the existing resource directories is extracted. Then, the segments of information are stored with an annotation indicating which version of said resource directories was used for processing said information segment. Follows a step of updating at least one of the said resource directories with at least one new entity, if a new entity was found in the processed segment, and updating the version number of said at least one resource directory. Typically, the new entity is discovered in the stream of information. Then, the process reprocesses the stored segments of information containing the annotation indicating said segments of information were processed with a previous version of the at least one updated resource directory. Advantageously, the disclosed technology allows to store less of the information stream by identifying which information source might have to be reprocessed. Furthermore, only a subset of the stored segments of information are reprocessed, which improves processing time.

Figure 1:
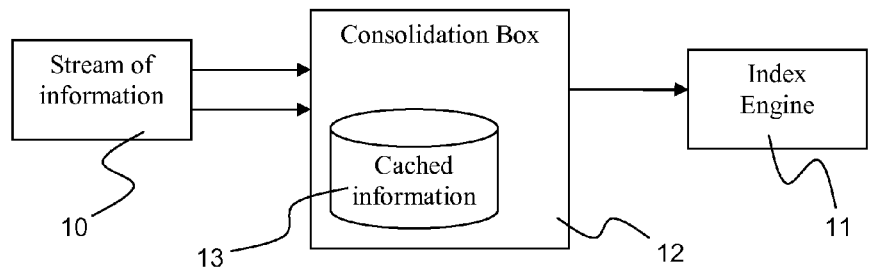

FIG. 1 depicts an embodiment of the process of the invention. A consolidation box 12 is inserted between streams of information 10 and a classic indexing engine 11, performs the process of the invention. The consolidation box is a computer system that allows transforming and aggregating data concerning an entity from one or more input information sources.

The consolidation box 12 retrieves streams of information from different information sources. Typically, the streams of information 10 are provided by the World Wide Web, also referred as the Web. However, the streams of information 10 may also be provided by private networks such as intranets or extranets. By the way, any source of information 10 may be used to carry out the invention, no matter their origin. The streams of information 10 provide segments of information related to entities. An entity is a typed data, wherein a typed data may comprise a set of values, a set of relationships to other data types and possibly operations on those values. For instance, a typed data may be a client name, a city, a product name, a sentiment value, a payment method. Segments of information are processed from the stream of information in accordance with entities stored on resource directories. Resource directories comprise entities and are annoted with a version number. Then, segments of information are cached 13 on the consolidation box which continuously and incrementally builds profiles relative to entities. Typically, profiles are stored on a profile repository 13 and are the output data produced by the consolidation box 12. Profiles are collection of data related to entities. Typically, profiles are data structures containing a type and a predefined set of metadata, each consisting of key-value pairs. Some metadata may be optional. By definition, the value part of an optional metadata key-value pairs may be empty. Other metadata may be obligatorily present in order for the data structure to be considered a profile. Thus, when the profile of an entity is completed, that is, when all the required data are aggregated, it is sent to the index engine 11 which indexes the data of the profile.

In practice, the consolidation box 12 may be a part of a Decision Support System (DSS). A DSS is a specific class of computerized information systems that supports business and organizational decision-making activities, intended to help decision makers compile useful information from raw data, documents, personal knowledge, and/or business models to identify and solve problems and make decisions.

Figure 2:
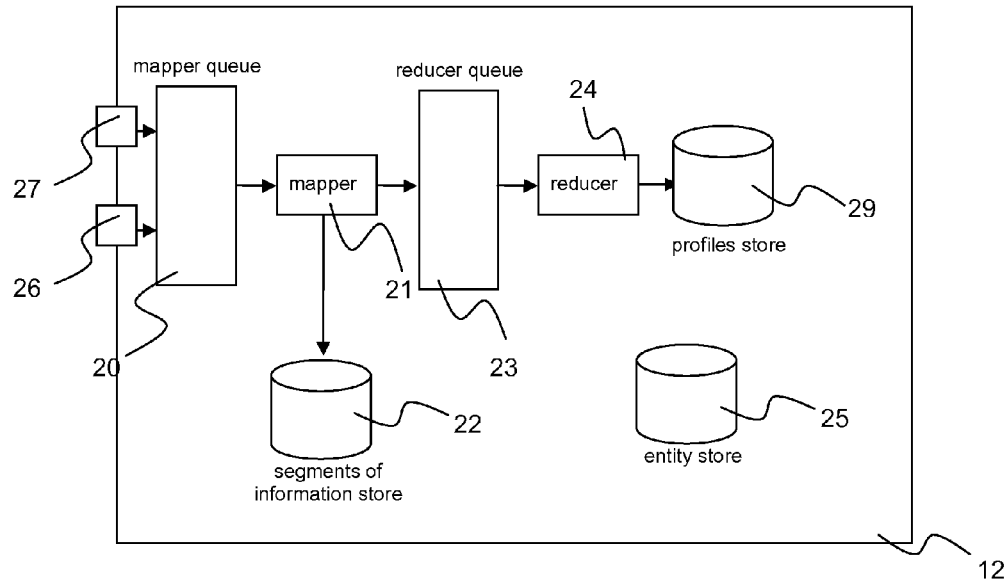
FIG. 2 depicts an embodiment of a consolidation box according to the invention.
Figure 3:
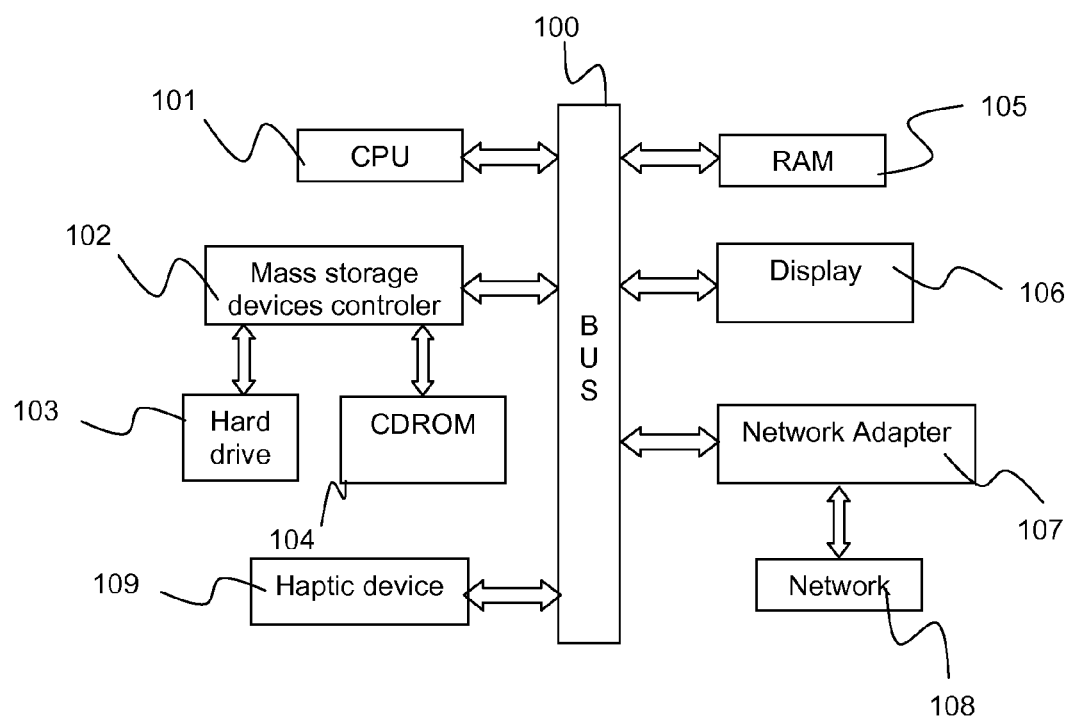
FIG. 3 is a schematic view of a hardware and software environment adapted for carrying out the invention.

Now, FIG. 2 depicts an embodiment of system, that is, a consolidation box, performing the process of the invention.

The consolidation box 12 is connected to the external world via connectors 26, 27. Connectors access stream of information sources and retrieve streams of information from different information sources. In practice, connectors are computer modules that connect to a data source (file system, web page, database, email) and which extract typed data (for example, XML specifying sender name, email body text, etc;) from that source. As a non limiting example, the connectors could continually crawl a given list of web sites concerning restaurants and extract segment of information from the stream of information, that is, from web pages describing restaurants.

The connectors allow users of the system to decide which stream of information might possibly provide segments of information for entities to be indexed. This decision may be taken according to the origin of the streams. The origin may be determined based of technical considerations of the source of the streams of information such as the geographical location of a server, its IP address, its services (HTTP, FTP . . . ). The origin may also be determined based on the type of the streams sources, e.g. website, forum, comments in a website, blogposts. . . . One understands that it is advantageous to select streams of information according to selected information sources: the amount of data may thus be drastically reduced (rather than crawling the entire Web), and computational resources of the consolidation box 12 are therefore preserved. Advantageously, the decision may be taken even if the entities to be indexed are not yet known to the system. This is advantageous because the user has the possibility to foresee that, if a given entity is discovered, no information related to that entity will be lost.

Connectors extract segments of information from the streams. Segments of information are input data processed by the consolidation box. Each segment of information is a data structure. In practice, the data structure of a segment of information contains a type, an optional URI (Universal Resource Identifier) and a set of unconstrained metadata, each consisting of a key and value pair. Once retrieved, segments of information from the streams of information are processed, in accordance with current versions of the resource directories.

When the processing of the segments of information input to the consolidation box 12 begins, a unique identifier may be assigned to each processed segment of information. Incidentally, an identifier may also be assigned to each entity in the system. Typically, for each new entity revealed in a processed segment of information, both identifiers are the same. Thus, it is assigned a master reference identifier by a master reference identifier generator which processes part of the metadata in the segment of information. For example, if one of the entities relates to a restaurant, the identifier generator might take metadata containing the name of the restaurant and its address to produce a restaurant master reference identifier of the entity restaurant. More generally, each segment of information of a given type is mapped to a specific identifier generator. The (entity) master reference identifier links multiple segments of information about an entity to a single profile concerning that entity. If the segment of information contains a URI, a mapping between the URI and the generated (entity) master reference identifier is registered into a Document Identifier Hashtable (DIH).

Once the master reference identifier is calculated, the process assigns the segment of information to a mapper queue 20, where it waits for further processing. The assignment may be performed according to the type of the segment's source. In practice, the process of assigning may be performed by a consolidation box manager which is a master program managing communication inside the consolidation box 12.

The mapper queue 20 is processed thanks to a map-reduce mechanism 21, as known in the art. The map-reduce mechanism 21 relies on a framework for processing huge datasets using a large number of computers, collectively referred to as a cluster. A segment of information is mapped 21 to an entity type specific process which attempts to extract further metadata concerning each identity identified by an entity master reference identifier. This processing is a highly parallelized processing where heavy computing operations such as natural language processing and information extraction are performed on the segments of information. Information extraction is a domain of natural language processing which recognizes certain types of entities (for example, people, places, moneys, dates, organizations, products) from unstructured or structured text. Entity recognition techniques involve using lists, rules or a combination of the two. Entities can also be tagged in entity hierarchies. Entities are stored in the entity store 25 of the consolidation box 12. In addition, entities identified in segment of information while processing the segments may also be storied in the entity store 25.

After processing segments of information in accordance with entities of resource directories by the mapping mechanism, segments of information are stored in the dedicated store 25. Incidentally, it is possible to declare each segment of information mapped to an entity type as storable or non storable in the initial configuration of the consolidation box 12 according the entity type. If the entity type is declared as non storable, then the segment of information will be not stored. On the contrary, if the entity type with which a segment of information is mapped is configured as storable, then the segment of information is stored in its original format, possibly with additional metadata produced during the mapping stage, but certainly annotated with the version numbers of the resources the segment was processed with, into a segment of information store 22 internal to the consolidation box. Indeed, as seen above, the entities are stored in resource directories, as called entity stores 25. A resource directory corresponds to a certain type of entity, and each resource directory has a version number.

The processing of information segments may reveal new entities, e.g. using the above mentioned entity recognition. Resources may be used to identify entities, and may be comprised of lists, dictionaries, thesaurus, or ontologies. These new entities are stored in the entity stores 25. The new entities added to the resource directories 25 may contain an annotation indicating the version number given to the resource directory once modified with the addition of this new entity added. Accordingly, an update of the corresponding resource directories is performed, which involves changing the respective version number of each resource directory. In addition, some parts of the previously seen information stream (stored in the segment of information store 22) may contain information for these new entities. Therefore, the stored 22 segments of information, containing the annotation indicating that they were processed with a previous version of the resource directory, are reprocessed. The reprocessing of the stored segments of information may also be performed in accordance with the new entities added to the resource directories. One understands that the annotation of each segment of information is advantageous as the process is able to select which segments stored in the segment of information store 22 were processed using a previous version of an entity resource. Segments not processed with the same type of entity resource are not selected for reprocessing. Therefore, and thanks to this selection, only a subset of the segment of information stored in the store 22 are reprocessed, and as a result, computational resources are preserved and processing time is improved. In addition, less of segments of information of streams need to be stored, thus reducing storage costs, by identifying which information sources might have to be reprocessed. In an additional advantage, the resource version numbers allow, during reprocessing of the segment of information, to only extract information for entities that have appeared in new versions of the entities resource directories: indeed, in these resource directories, each entity is also annotated with the version number of the resource directory in which the entity first appeared, allowing the system to recognize during reprocessing which entities might need new information extraction. Again, by only extracting information for new entities, processing time is decreased when reprocessing stored segments of information.

Incidentally, new entities may be revealed while processing segments of information from the streams of information, but may also be inputted by a user. In addition, the consolidation box 12 may also provide an interface to dynamically update natural language processing resources. Each resource possesses a version number. Once the updates of a resource have been committed, the version number changes, and therefore, reprocessing of concerned segments of information may be performed.

Next, after processing by the mapping mechanism and storing the segment of information with any additional metadata, processed segments of information are added into a reducer queue 23. Each entity has an associated reducer which is defined in the configuration of consolidation box 12. The reducer is a computer program that can take as input one or several segments of information.

Profiles are created at reducing stage 24. If an entity with the same master reference identifier already exists, it will be fetched from the entity store 25, local to the consolidation box. Segments of information are processed sequentially per targeted entity. The reducing mechanism stores all profiles, even those missing some required metadata, into a profiles store local to the consolidation box 12.

If a profile contains all the required metadata defined for this entity type in the consolidation box configuration, the reducing mechanism 24 also sends the profile to the indexing chain 11, external to the consolidation box 12.

A scenario illustrating an embodiment of the process according to the invention is now presented. In this scenario, three sources of information are processed by the consolidation box 12: restaurants web sites, comments and blog entries (also called blogposts). Profiles of restaurants are built from the processed information and may comprise fields such as name, address, payment method, menu, customer sentiment, etc. associated with each restaurant.

Two connectors 26, 27 access stream of information sources and push segments of information from the stream of information into the consolidation box 12. One connector extracts restaurants information and comments from several restaurant review websites and pushes them into the consolidation box 12, and a second connector extracts blog entries from several blogs and pushes them into the consolidation box 12.

In this scenario, the first connector supplies the following segment of information to the consolidation box:

```
<Data type="restaurant">
    <meta name="URI"
value="http://www.restaurantreviews.com/ABCRestaurant" />
    <meta name="restaurantName" value="ABC Restaurant" />
    <meta name="address" value="123 food street" />
</Data>
```

The segment of information comprises a type, "restaurant", an optional universal resource identifier, "http://www.restaurantreviews.com/ABCRestaurant", and a set of unconstrained metadata, each metadata comprising a key and a value pair (for instance, the key name="restaurantName" and the value="ABC Restaurant"). This segment of information is thus a restaurant segment of information.

The consolidation box 12 processes this restaurant segment of information. A master reference identifier generator for the "restaurant" type segment of information is computed. The master reference identifier generator, associated with this type ("restaurant") of segment of information in the configuration of the consolidation box 12, analyzes and normalizes the restaurant address and name to generate a unique entity master reference identifier of the entity "restaurant named ABC Restaurant". The entity master reference identifier is added to the segment of information as new metadata. Using this entity master reference identifier as unique key, information gathered for the same entity "restaurant named ABC Restaurant" across different reviews websites will be aggregated into the same profile of this entity. Advantageously, if there were another "ABC restaurant" at a different street address, the generator would generate a distinct entity master reference identifier for this second restaurant, thus making the distinction between the entity "restaurant named ABC Restaurant" and the second restaurant which is a second restaurant entity.

Next, as the segment of information has an URI as metadata, the manager of the consolidation box registers a mapping between the URI and the previously computed entity master reference identifier into the Document Id Hashtable, the DIH, local to the consolidation box 12. The hashtable is a data structure that uses a hash function to efficiently map entity master reference identifier to associated URI. Advantageously, the use of a hashtable allows for performing efficient searches.

Then, the consolidation box manager pushes the restaurant segment of information into the mapper queue 22. The assignment of the stream of information into a mapper queue is performed such that the mapper queue is selected according to the type (or information source) of the stream of information. As this segment of information is related to an entity of type "restaurant", the restaurant segment of information is sent in a mapper queue for restaurant type segments of information. The mapper manager program is activated by the consolidation box manager and the restaurant segment of information in the mapper queue is processed by a map-reduce mechanism 21.

Next, the restaurant segment of information is extracted by the mapper manager and sent to a restaurant mapper. The restaurant mapper is a program and verifies in a resource local to the consolidation box whether the (restaurant name, entity master reference identifier) pair exists already. If the (restaurant name, entity master reference identifier) pair extracted by the mapper program does not exist in the resource, then the resource will be programmed for updating, the new information will be stored in a local file, and the resource will be marked as "dirty", meaning that new information is available to build a new version at some later time.

Next, as the restaurant segment of information is not configured to be storable, it is not written in the segment of information store 22.

Then, restaurant segment of information is sent by the mapper 21 into the reduce queue 23.

When the reducing stage is triggered, the restaurant segment of information is processed by the restaurant entity reducer. As no profile exists yet for the entity master reference id of the entity "restaurant named ABC Restaurant", a new profile is created. The new profile comprises a type and a predefined set of metadata, each metadata comprising a key and a value pair. The profile is enriched with all the information generated by the mappers from the original segments of information, as well as from any other segment of information in the reduce queue that is related to this entity master reference identifier of the entity "restaurant named ABC Restaurant".

Then, the newly modified profile is stored in the profile repository, that is, the profiles store 29. If the stored profile contains all the metadata required, that is all the mandatory fields of the profile are filled out, then the profile is sent to be indexed by the classic index engine 11 outside of the consolidation box 12.

A second connector supplies the following blogpost segment of information and sends it to the consolidation box:

```
<Data type="blogpost">
    <meta name="URI" value="http://www.foodblog.com/entries/1" />
    <meta name="text" value="Today we tried ABC Restaurant, and it was fabulous."/>
</Data>
```

The consolidation box processes this segment of information by first sending this segment of information of type "blogpost" to a master reference identifier generator program associated in the consolidation box configuration for segments of information of "blogpost" type (e.g. the sources of the streams of information are blogs). This master reference identifier generator program generates a simple fingerprint of the document as its master reference identifier. This segment of information is thus a blogpost segment of information.

Next, as the blogpost segment of information has an URI, an entry in the DIH is added, thus mapping the URI of the blogposts segment of information to its entity master reference identifier.

Then, the manager of the consolidation box 12 inserts the blogpost segment of information into the queue 20 for mapping.

The map manager program is then activated by the manager of the consolidation box so that the blogpost segment of information will be processed by a mapper 21 which is dedicated for segments of information of "blogpost" type. This "blogpost" mapper performs natural language processing matching against the resource that contains restaurant names. If the "blogpost" mapper 21 detects a known restaurant name in the blogpost, a note with the restaurant entity master reference identifier will be added to the blogpost segment of information. In this case, as the resource directory of "restaurants name" has not yet been updated with the "ABC Restaurant" name of the entity "restaurant named ABC Restaurant", no names are matched so far.

Next, as segments of information of "blogpost" type are declared in the configuration of the consolidation box 12 as storable, this blogpost segment of information is stored into the segments of information store 22, annotated in order to indicate which version of the resource directories was used while being processed. In this case, the current version of the restaurant name resource is version 0.

Then, the blogpost segments of information are sent by the mapper 21 into the reduce queue 23.

After that, the reducing stage is activated by the consolidation box manager and a new blogpost profile will be created by the blogpost reducer. To this aim, the metadata of the blogpost segment of information are copied in a newly created profile as no profile exists yet for the master reference id of this blogpost segment of information.

Afterwards, the blogpost profile will be stored in the profiles store 29, internal to the consolidation box. In addition, if all the required metadata are present in the profile, the reducer will also send the profile outside the consolidation box 12 to be indexed in a classic external indexer 11.

The current version of the restaurant names resource is version 0. At one point, the consolidation box manager will decide to build a new version of the restaurant names resource. Incidentally, an outside event may also trigger the update of resources, e.g. upon user decision. In this new version of the resource, namely the version 1, the restaurant name "ABC restaurant" of the entity "restaurant named ABC Restaurant" and its entity master reference identifier will appear in the resource directory of restaurant names. Once this new version 1 of the resource directory of restaurant names is built, by integrating all the new (restaurant name, entity master reference identifier) pairs found, the consolidation box manager will go through all the segments of information stored in the local segments of information store 22, marking any segment of information using a previous version of this resource as "dirty". These data need to be reprocessed with the new resource, since they may contain information that we missed with the previous version of the resource, for example, information about a previously unknown restaurant. The process is able to select which segments stored in the segment of information store 22 were processed using a previous version of a resource. Therefore, only a subset of the segment of information stored in the store 22 are reprocessed, and as a result, computational resource and processing time are preserved. In addition, fewer segments of information of streams need to be stored, thus reducing storage costs, by identifying which information sources might have to be reprocessed. Furthermore, as the annotated segments of information are stored in the local segments of information store 22, there is no need to refetch information from outside information sources when the resources are updated. This significantly reduces the consumption of network bandwidth.

The consolidation box manager then activates a "Reprocess obsolete Business Data" program which causes all the "dirty" segment of information to re-enter the consolidation process by inserting the blogpost segment of information into the queue 20 for mapping.

This time, the mapper matches the restaurant name "ABC restaurant" of the entity "restaurant named ABC Restaurant" in the text of the blogpost segment of information, and adds a note with the "ABC restaurant" entity Item master reference identifier to the blogpost segment of information.

Then the blogpost segment of information is queued up for reducing in the blogpost reducer and the restaurant reducer. The blogpost reducer searches the local profiles store 29 using the master reference identifier of the blogpost, finds the previously constructed profile corresponding to this blogpost and then adds the master reference identifier of the restaurant to this existing blogpost profile.

The restaurant reducer, reducing this same blogpost segment of information, fetches the profile of the entity "restaurant named ABC Restaurant" and increases the number of blogpost that are related to this entity, or computes sentiment analysis if sentiment analysis metadata was added to the blogpost segment of information by the mapper.

Finally, both the blogpost and the restaurant profiles are stored in the profile store and sent off to the external indexer 11 if they contain their respective mandatory set of metadata.

A third type of source of information processed in this scenario is restaurant comments. Contrary to blogposts that are from a different connector and requires natural language processing techniques, comments are extracted on the same web pages as restaurants or pages directly linked to them.

The restaurant connector pushes the following segment of information (of type "comment") to the consolidation box:

```
<Data type="comment">
<meta name="URI"
value="http://www.restaurantreviews/ABCRestaurant/comments" />
<meta name="restaurant_URI"
value="http://www.restaurantreviews.com/ABCRestaurant" />
<meta name="text" value="This is the best restaurant." />
</Data>
```

The consolidation box manager sends the comment of the segment of information to the master reference id generator associated to comment segments of information. Since comments do not have complex resolution rules, a simple fingerprint of the document is assigned as its comment master reference identifier.

Next, as the comment segment of information contains an URI, an entry in the DIH is added mapping the comment URI to its comment master reference id.

Then, this comment segment of information is processed and sent by the consolidation box manager to the mapping queue 20. When the consolidation manager activates the mapping mechanism 21, the comment segment of information is processed by the comment mapper. This mapper performs a simple lookup into the DIH to resolve the restaurant_URI into a restaurant master reference identifier, and adds the corresponding restaurant master reference identifier as new metadata in the comment segment of information.

After that, the comment segment of information is defined as not storable in the consolidation box configuration, and the comment segment of information is not stored in the local segment of information store 22.

Next, the mapper places the augmented comment segment of information into the reduce queue. When the reducing stage is activated by the consolidation box manager, the comment segment of information will be processed by both the comment reducer and the restaurant reducer. The restaurant reducer fetches the "ABC restaurant" profile from the profile store 29 and increases the number of comments that are related to this restaurant, or computes sentiment analysis and stores the updated restaurant profile back into the profile store 29. The comment reducer creates a new comment profile and copy the metadata of the comment segment of information into the profile of the comment segment of information.

Finally, the profile of the comment is be stored in the profile store 29, and eventually sent to the index engine 11 if all the required metadata are present.

It is to be understood that the foregoing method can be applied to any stream of information in any configuration capable of being defined by a system. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language or in assembly or machine language if desired; and in any case, the language may be a compiled or interpreted language.

FIG. 5 shows a computer system, e.g. a consolidation box. The consolidation box comprises a central processing unit (CPU) 101 connected to an internal communication BUS 100, a random access memory (RAM) 105 also connected to the BUS. A mass storage device controller 102 manages accesses to a mass memory device, such as hard drive 103. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 104. Any of the foregoing may be supplemented by, or incorporated in, specially designed ASICs (application-specific integrated circuits). A network adapter 107 manages accesses to a network 108. The consolidation box may comprise a display 106 and a haptic device. By this way, a user may interact with the computer system, e.g. for modifying the natural language processing resources.

The preferred embodiment of the present invention has been described. It will be understood that various modifications may be made without departing from the spirit and scope of the invention. Therefore, other implementations are within the scope of the following claims. For instance, the process of the invention may be carried out by an index engine.

The invention claimed is:

1. A computer-implemented process comprising:
processing information related to entities recognized from text resources and said entities being contained in a stream of information, the entities being stored in resource directories of a system, each type of entity being contained in a corresponding resource directory that is annotated with a version number modified with the addition of at least one new entity of the same type, said processing information being by:
retrieving a stream of textual information from different information sources;
processing segments of information from the stream of textual information in accordance with existing entities of said resource directories, wherein the processed segments of information comprise a type and set of unconstrained metadata, each metadata comprising a key and a value pair;
storing the segments of information with an annotation indicating which versions of said resource directories were used for processing said information segments;
enriching a profile of an existing entity with information resulting from processing the segments of information from the stream of textual information;
updating at least one of the said resource directories with at least one new entity and updating the version number of said at least one resource directory;
reprocessing the stored segments of information containing the annotation indicating said segments of information were processed with a previous version of the at least one resource directory;
creating a new profile of the at least one new entity added to the at least one resource directory and enriching the new profile with information resulting from processing the segments of information from the stream of textual information; and wherein the at least one new entity added to the at least one resource directory contains an annotation indicating the version number given to the at least one resource directory once modified with the addition of said at least one new entity and wherein the step of reprocessing further comprises:

extracting, from the at least one resource directory, the at least one new entity containing the annotation indicating the at least one new entity was added to the at least one resource directory after processing the segments of information; and reprocessing the stored segments of information in accordance with the extracted at least one new entity.

2. The process of claim 1, wherein a unique identifier is assigned to each processed segment of information and to each entity.

3. The process of claim 2, wherein the identifier assigned to each new entity is the same as the identifier of the processed segment which revealed the said each new entity.

4. The process of claim 1, wherein at the step of processing segments of information from the stream of textual information, new entities are revealed or inputted by a user and are added in the corresponding resource directories.

5. The process of claim 1, wherein the processed segments of information are data structures.

6. The process of claim 1, wherein the processed segments of information from the stream of textual information are stored according to selected information sources.

7. The process of claim 1, further comprising, prior to the step of processing segments of information from the stream, the step of:

assigning the retrieved stream of textual information into a mapper queue, the mapper queue being selected according to the information source of the stream of textual information and being processed by a map-reduce mechanism.

8. The process of claim 4, further comprising, after the step of processing segments of information from the stream of information, the steps of:

assigning the processed stream of information into a reducer queue, the reducer queue being selected according to the information source of the stream of textual information; and for each revealed new entity, creating a new profile of the revealed new entity and enriching the profile with information resulting from the step of processing segments of information from the stream of textual information; wherein the profile of the existing entity or the new profile of the revealed new entity comprises a type and a predefined set of metadata, each metadata comprising a key and a value pair.

9. The process of claim 8, wherein the profile of the existing entity and the new profile of the new entity are stored in a profile repository.

10. The process of claim 8, further comprising the step of: sending a completed profile of an entity to an indexing engine.

11. The process of claim 2, wherein, at the step of processing segments of information from the stream of textual information, a mapping between a universal resource locator identified in one of the segments of information and the unique identifier assigned to said one of the segments of information is registered by the system into a hash directory.

12. A computer program product comprising:

a non-transitory computer readable medium storing thereon computer readable code, for processing information related to entities recognized from text resources and said entities being contained in a stream of textual information; and the computer readable code comprising code means for causing a computer to take the steps of:

retrieving a stream of textual information from different information sources;

processing segments of information from the stream of textual information in accordance with entities stored in resource directories of a system, each type of entity being contained in a corresponding resource directory that is annotated with a version number modified with the addition of at least one new entity of the same type, wherein the processed segments of information comprise a type and a set of unconstrained metadata, each metadata comprising a key and a value pair;

storing the segments of information with an annotation indicating which versions of said resource directories were used for processing said information segments;

enriching a profile of an existing entity with information resulting from processing the segments of information from the stream of textual information;

updating at least one of the said resource directories with at least one new entity and updating the version number of said at least one resource directory;

reprocessing the stored segments of information containing the annotation indicating said segments of information were processed with a previous version of the at least one resource directory;

creating a new profile of the at least one new entity added to the at least one resource directory and enriching the new profile with information resulting from processing the segments of information from the stream of textual information; and wherein the at least one new entity added to the at least one resource directory contains an annotation indicating the version number given to the at least one resource directory once modified with the addition of said at least one new entity and wherein the step of reprocessing further comprises:

extracting, from the at least one resource directory, the at least one new entity containing the annotation indicating the at least one new entity was added to the at least one resource directory after processing the segments of information; and reprocessing the stored segments of information in accordance with the extracted at least one new entity.

13. A computer apparatus comprising:

a computer-implemented consolidation box for processing information related to entities recognized from text resources and said entities being contained in a stream of textual information, the entities being stored in resource directories of a system, each type of entity being contained in a corresponding resource directory that is annotated with a version number modified with the addition of at least one new entity of the same type, wherein the computer-implemented consolidation box comprises:

a module for retrieving a stream of textual information from different information sources;

a module for processing segments of information from the stream of textual information in accordance with entities of said resource directories, wherein the processed segments of information comprise a type and a set of unconstrained metadata, each metadata comprising a key and a value pair;
a module for storing the segments of information with an annotation indicating which versions of said resource directories were used for processing said information segments;
a module for enriching a profile of an existing entity with information resulting from processing the segments of information from the stream of textual information;
a module for updating at least one of the said resource directories with at least one new entity and updating the version number of said at least one resource directory;
a module for reprocessing the stored segments of information containing the annotation indicating said segments of information were processed with a previous version of the at least one resource directory;
a module for creating a new profile of the at least one new entity added to the at least one resource directory and enriching the new profile with information resulting from processing the segments of information from the stream of textual information; and
wherein the at least one new entity added to the at least one resource directory contains an annotation indicating the version number given to the at least one resource directory once modified with the addition of said at least one new entity and wherein the reprocessing further comprises:
extracting, from the at least one resource directory, the at least one new entity containing the annotation indicating the at least one new entity was added to the at least one resource directory after processing the segments of information; and
reprocessing the stored segments of information in accordance with the extracted at least one new entity.

14. The process of claim 1, wherein the processed segments of information comprise an universal resource identifier.

* * * * *